United States Patent
Prasad

(10) Patent No.: US 7,059,311 B2
(45) Date of Patent: Jun. 13, 2006

(54) AIR/OIL SEPARATING DEVICE

(75) Inventor: Hari Prasad, Troy, MI (US)

(73) Assignee: Shiloh Industries, Inc., Cleveland, OH (US)

( * ) Notice: Subject to any disclaimer, the term of this patent is extended or adjusted under 35 U.S.C. 154(b) by 36 days.

(21) Appl. No.: 10/917,071

(22) Filed: Aug. 12, 2004

(65) Prior Publication Data
US 2006/0032486 A1  Feb. 16, 2006

(51) Int. Cl.
F02M 25/06 (2006.01)
F01M 13/04 (2006.01)
B01D 45/16 (2006.01)

(52) U.S. Cl. .................. 123/573; 96/189; 55/447; 55/DIG. 19

(58) Field of Classification Search .............. None
See application file for complete search history.

(56) References Cited

U.S. PATENT DOCUMENTS

| | | | |
|---|---|---|---|
| 4,579,092 A * | 4/1986 | Kandler | 123/41.86 |
| 5,460,147 A * | 10/1995 | Bohl | 123/572 |
| 5,507,268 A | 4/1996 | Schlattl | |
| 5,617,834 A | 4/1997 | Lohr | |
| 6,234,154 B1 | 5/2001 | Spix | |
| 6,453,892 B1 | 9/2002 | Plunkett et al. | |
| 6,475,255 B1 | 11/2002 | Walker, Jr. | |
| 6,530,367 B1 | 3/2003 | Akiwa et al. | |
| 6,591,820 B1 | 7/2003 | Kitano et al. | |
| 2003/0110743 A1 * | 6/2003 | Stegmaier et al. | 55/337 |

FOREIGN PATENT DOCUMENTS

| | | |
|---|---|---|
| EP | 0 018 168 A2 | 10/1980 |
| EP | 0 024 148 A1 | 2/1981 |
| EP | 0 487 203 A2 | 5/1992 |
| EP | 0730086 | 9/1996 |
| EP | 0 711 903 B1 | 9/1999 |
| JP | 3169313 | 7/1991 |

* cited by examiner

Primary Examiner—Andrew D. Dolinar
(74) Attorney, Agent, or Firm—Rising, Ethington, Barnes, Kisselle, P.C.

(57) ABSTRACT

An air/oil separating device for removing oil that has become entrained in blow-by gases passing through a crankcase of an internal combustion engine. The air/oil separating device includes a spiral element forming a spiral passageway and a perforated tube. As the air/oil stream passes through the spiral passageway and contacts its walls, a certain amount of the entrained oil is removed or scavenged such that it collects at the bottom of the spiral passageway. The treated air stream, now having less entrained oil, passes into the perforated tube and exits at an upper axial end, while the collected oil drains back into the crankcase via a lower axial end of the perforated tube. The air/oil separating device can be incorporated within a cap assembly also having an oil-fill cap and/or a PCV valve.

24 Claims, 2 Drawing Sheets

AIR/OIL SEPARATING DEVICE

TECHNICAL FIELD

The present invention relates generally to a device that separates oil from air, and more particularly, to a device that separates an air/oil stream in an internal combustion engine.

BACKGROUND OF THE INVENTION

During operation of an internal combustion engine, an air/fuel mixture is introduced into a combustion chamber and is subsequently ignited by a spark plug. That ignition causes an explosion which burns the air/fuel mixture and initiates the engine's power stroke. During the power stroke, a certain amount of burnt air/fuel mixture, typically referred to as blow-by gas, blows by the piston ring and leaks between the piston and cylinder wall such that it ends up in the engine crankcase. If these blow-by gases are not sufficiently removed from the crankcase, they can degrade the quality of the lubricating oil already present within the crankcase, as well as increase the crankcase pressure causing damage to engine components such as seals.

It is therefore known in the internal combustion engine art to use a positive crankcase ventilation (PCV) valve to vent the crankcase pressure and eventually reintroduce the blow-by gases into the combustion chamber. During their time in the crankcase and valve cover, the blow-by gases pick up and draw along a certain amount of fine oil mist such that they become entrained with the oil mist. The term 'air/oil stream' is broadly used herein to include any gas that is entrained with or otherwise carries some degree of oil or other lubrication. Examples of some gases that could be constituents of an 'air/oil stream' are air, unburnt air/fuel mixtures, burnt air/fuel mixtures (exhaust), and blow-by gases, to name but a few. This air/oil stream must be treated with an air/oil separator so that the oil or other lubricant can be removed before reusing them in the combustion chamber. If the air/oil stream is not treated, the entrained oil can negatively impact the combustion process when it mixes with a fresh air/fuel mixture, and the entrained oil can become deposited over the catalytic converter which can reduce its operating life.

Various types of air/oil separators have been developed, including cyclonic-type separators, baffles, deflectors, cloth filters, foam, and other types of oil scavenging devices. Some examples of air/oil separators are disclosed in U.S. Pat. Nos. 5,617,834, 6,234,154, 6,453,892, 6,475,255, 6,530,367 and 6,591,820 and European Patent Nos. EP 0 024 148 and EP 0 487 203.

SUMMARY OF THE INVENTION

In accordance with one aspect of the present invention there is provided an air/oil separating device for separating an air/oil stream in an internal combustion engine. The air/oil separating device includes a spiral element having a spiral passageway, wherein at least some oil is removed from the air/oil stream when it travels through the spiral passageway. The removed oil drains out of a second outlet of the air/oil separating device, while a treated air stream exits out of a first outlet of the device.

According to another aspect of the present invention, there is provided an air/oil separating device that includes a passageway and a tube. The passageway has an exterior and an interior wall that form at least one full loop, and the tube is in fluid communication with the passageway. The air/oil stream travels through the passageway such that it contacts the exterior and interior walls, which causes at least some oil from the air/oil stream to collect within the passageway and drain out of the tube.

According to yet another aspect of the present invention there is provided an oil-fill cap assembly generally including an air/oil separating device and an oil-fill cap.

According to yet another aspect of the present invention, there is provided a method of manufacturing an air/oil separating device.

Objects, features and advantages of this invention include, but are not limited to, providing an air/oil separating device for removing oil from an air/oil stream such that the removed oil is able to drain from the device and a treated air stream is able to flow out of the device, and providing a design that is of relatively simple design, economical manufacture and assembly, is serviceable, and has a long and useful life in service.

BRIEF DESCRIPTION OF THE DRAWINGS

These and other objects, features and advantages of this invention will be apparent from the following detailed description of the preferred embodiments and best mode, the appended claims and the accompanying drawings, in which:

DETAILED DESCRIPTION OF THE PREFERRED EMBODIMENTS

Figure 1:
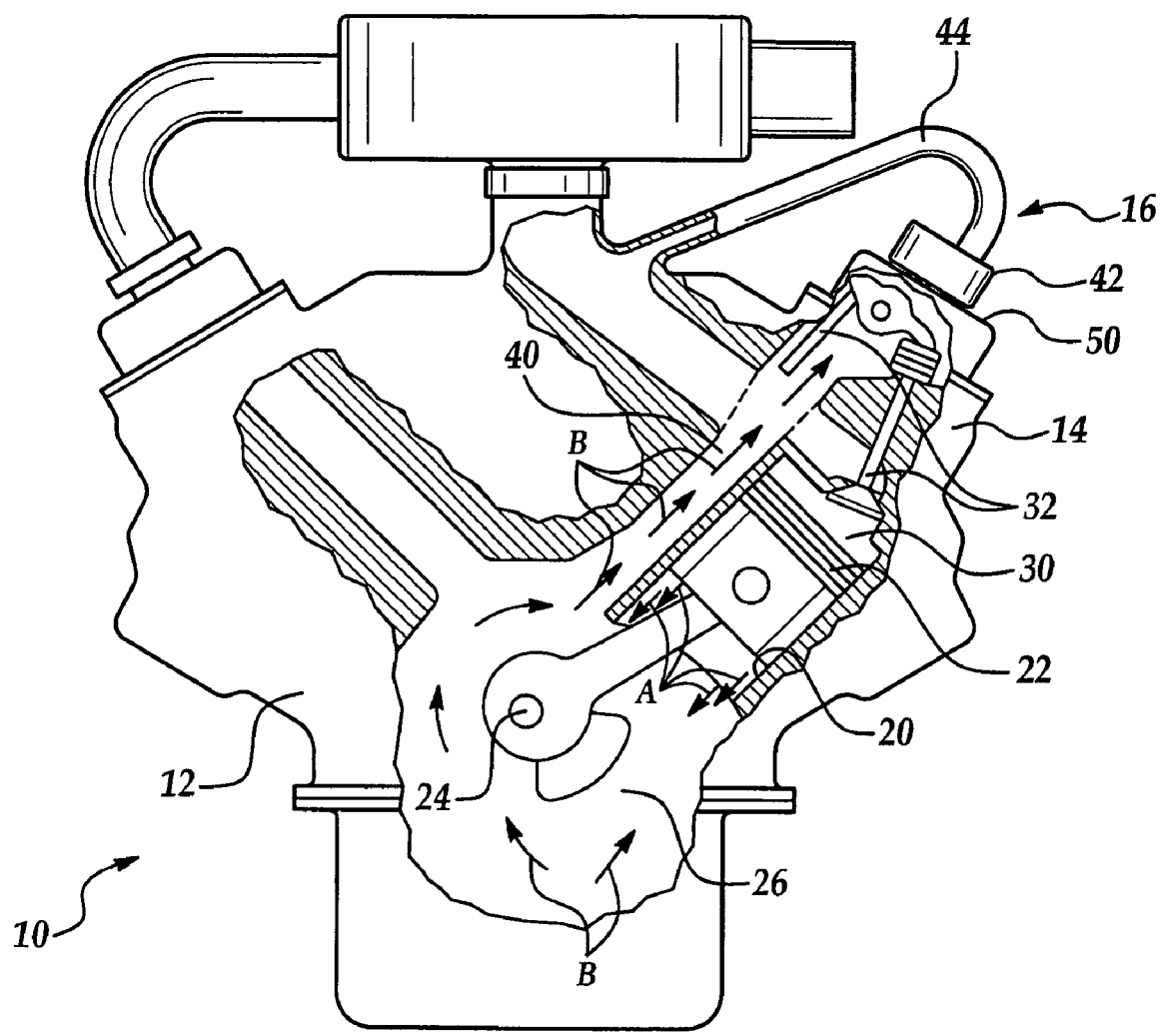
FIG. 1 is a cutaway view of an internal combustion engine including an embodiment of a crankcase ventilation system (CVS)

With reference to FIG. 1, there is shown a V-type multi-cylinder internal combustion engine 10 having an engine block 12, a cylinder head 14, and a crankcase ventilation system (CVS) 16. As is well known in the art, engine block 12 includes a number of cylinders 20 that reciprocally house an equal number of pistons 22. The pistons are each in turn connected to a crankshaft 24 that rotates within a crankcase 26. The cylinder head 14 is mounted atop engine block 12 such that each cylinder 20 has a combustion chamber 30 formed between a lower surface of the cylinder head and an upper surface of the corresponding piston. A set of valves 32 control both the intake and exhausting of gases to and from the combustion chamber, as is widely appreciated in the art. A certain amount of blow-by gas, which is represented by arrows A, enters crankcase 26 where it picks up an oil mist such that the blow-by gases becomes entrained with the oil mist. This air/oil stream, represented by arrows B, can be reintroduced into combustion chamber 30 via the CVS 16, but the oil must first be removed.

Figure 2:
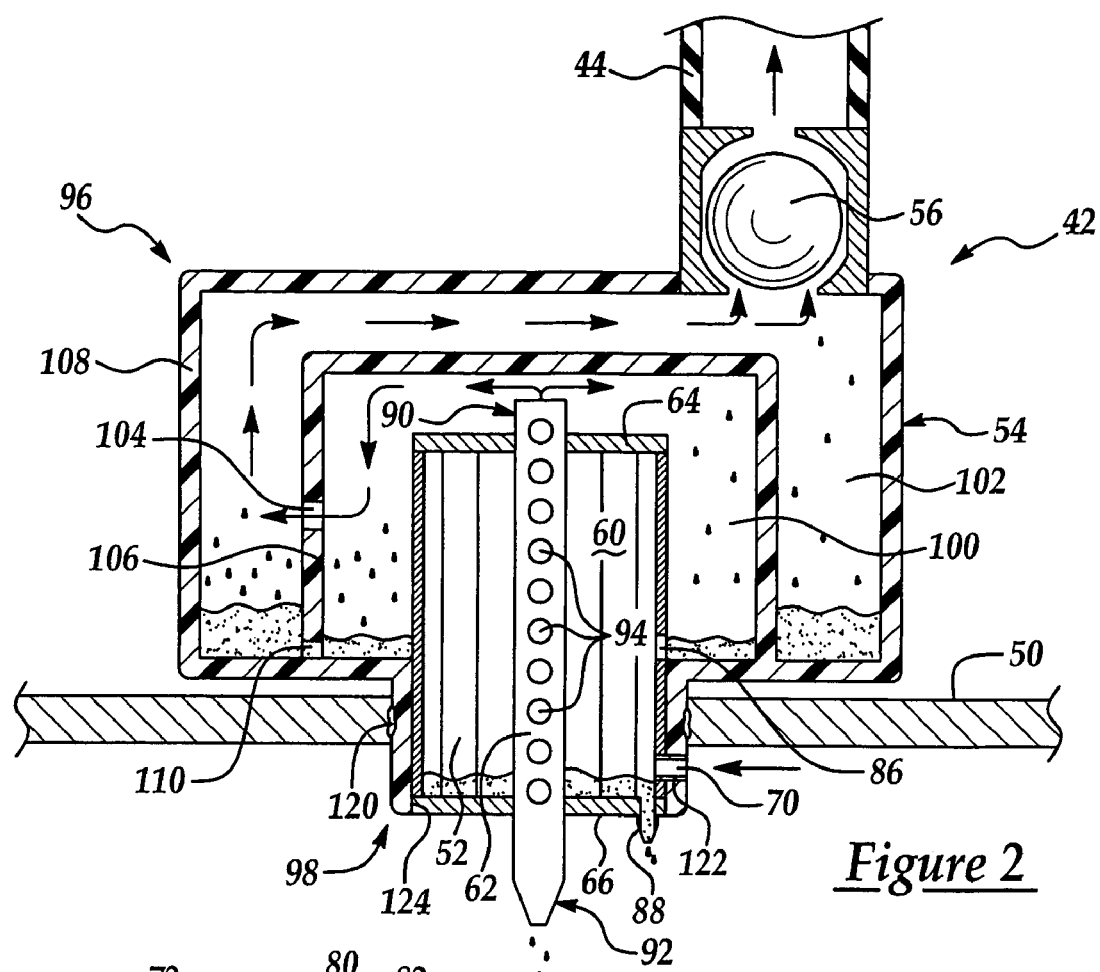
FIG. 2 is a cutaway view of an embodiment of an oil-fill cap assembly of the crankcase ventilation system of FIG. 1.

Crankcase ventilation system (CVS) 16 reintroduces the air/oil stream back into combustion chamber 30 after a sufficient amount of the entrained oil has been removed. According to one embodiment of the invention, CVS 16 includes a ventilation passage 40, an oil-fill cap assembly 42, and a return passage 44. The ventilation passage 40 shown in FIG. 1 is an example of a passage that is in communication with crankcase 26 at one end and an input of oil-fill cap assembly 42 at the other. Of course, the ventilation passage does not have to follow the specific path or be of the specific shape shown here, as alternative passages are widely known in the art and can be readily utilized with the air/oil separating device of this invention. Likewise, return passage 44, which connects an output of oil-fill cap assembly 42 with a conventional intake passage or intake manifold leading to combustion chamber 30, can be of an alternative shape and/or follow an alternative path. It should be recognized, that ventilation and return passages 40, 44 are not in direct communication with one another, as demonstrated by the dashed lines. With reference now to FIG. 2, oil-fill cap assembly 42 is described in greater detail.

Figure 3:
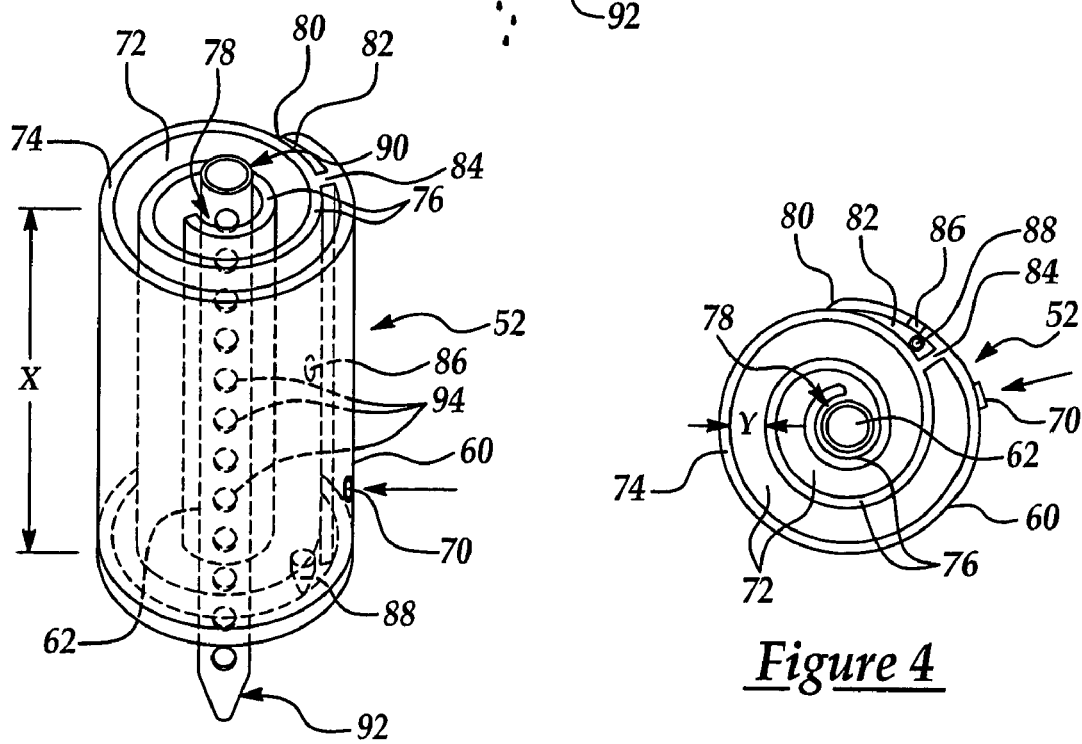
FIG. 3 is a perspective view of an embodiment of an air/oil separating device of the oil-fill cap assembly of FIG. 2.
Figure 4:
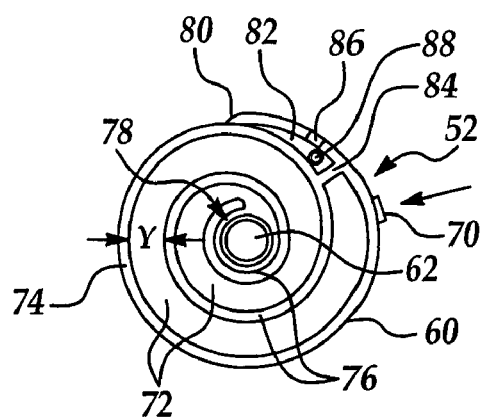
FIG. 4 is a cross-sectional view of the air/oil separating device of FIG. 3.

Oil-fill cap assembly 42 engages an opening in a valve cover 50 and is in fluid communication with both ventilation passage 40 and return passage 44 so that the air/oil stream can flow there between. According to the embodiment shown here, oil-fill cap assembly 42 generally includes an air/oil separating device 52, an oil-fill cap 54, and a positive crankcase ventilation (PCV) valve 56. With specific reference to FIGS. 2–4, air/oil separating device 52 removes or scavenges oil that is entrained within the air/oil stream, and includes a spiral element 60, a perforated tube 62, and upper and lower covers 64, 66. As its name suggests, spiral element 60 is of a generally spiral shape, and includes an inlet 70, a spiral passageway 72 formed between exterior and interior walls 74, 76, and an outlet 78. It should be recognized that the term spiral broadly includes two- and three-dimensional shapes, such as a helix. The particular spiral passageway embodiment shown here includes three separate loops (360° turns of the spiral element), but that number could be increased or decreased as required. It is preferable that the spiral passageway have between 1–10 loops, and even more desirable that it have between 2–6 loops.

Inlet 70 provides the incoming air/oil stream with access to spiral passageway 72, and is preferably located towards a lower axial end of the spiral passageway. The air/oil stream enters the spiral passageway, and hence air/oil separating device 52, via inlet 70. The inlet should be oriented such that the incoming air/oil stream impinges the exterior and/or interior walls 74, 76 of the outermost loop of the spiral element. The greater the impact or amount of contact between the air/oil stream and the walls of spiral element 60, the greater the amount of oil removed from the mixture. Of course, alternatively designed inlets could be used in place of inlet 70, such as those that provide access to a portion of the spiral passageway that is located further inward than that shown here.

Exterior and interior walls 74, 76 of the spiral element are preferably made from an integral sheet of material that is coiled in a generally spiral shape, such that the various loops are generally concentric with one another. These walls could be produced by extruding spiral element 60 to the desired shape, or they could be formed from a flexible planar piece of material that is rolled up during the manufacturing process, to name but a few approaches. In the case of extrusion, a plastic capable of withstanding the corrosive environment, such as ABS, could be used; while the rolled form could be produced from a sheet of stainless steel or other treated metal. Spiral passageway 72 is the space or volume located between the exterior and interior walls 74, 76 of the spiral element, and according to the embodiment shown here, extends from a collection chamber 82 at a beginning point to an inner end or edge 78 at an ending point. Preferably, spiral passageway 72 has an axial length X that is greater than a radial width Y of one of its loops. In a most preferred embodiment, spiral passageway 72 has an axial length X of between 20 mm–80 mm, and a radial width Y of one of its loops of between 2 mm–8 mm.

Collection chamber 82 is a small section of spiral element 60 that acts as a drainage reservoir for oil collected in the oil-fill cap 54. As demonstrated in the drawings, collection chamber 82 is the volume or space formed between exterior wall 74, interior wall 76, an end or edge 80 of the exterior wall that is sealed along its axial extent, and a barrier wall 84. Put differently, collection chamber 82 is the beginning of the spiral passageway, but it is sealed off from the main section of spiral passageway 72 so that the air/oil stream entering inlet 70 cannot bypass the spiral passageway by escaping through the collection chamber. The collection chamber 82 has an opening 86 located approximately halfway up the axial length of spiral element 60 which allows oil collected in oil fill-cap 54 to drain into the collection chamber. The collection chamber also has an opening 88 located at its bottom axial end which allows oil within the collection chamber to drain back into crankcase 26. In order to prevent the air/oil stream in ventilation passage 40 from by-passing spiral passageway 72, opening 88 should be equipped with a device that allows oil to drain out of collection chamber 82 but prevents the air/oil stream from entering the collection chamber. Such a device is similar to that fitted at the bottom of perforated tube 62, which will be subsequently explained in greater detail. According to another embodiment, opening 88 is in fluid communication with the bottom portion of spiral passageway 72 so that oil from the collection chamber may intermingle with oil collected in the bottom of spiral passageway 72, and the both of which may drain out perforated tube 62.

End 78 is located at an inner end of spiral passageway 72 and instead of being sealed off along its axial extent, as with the outer end 80, the inner end is open along its entire axial extent. Accordingly, an air/oil stream flowing through spiral passageway 72 is able to exit the spiral passageway and enter perforated tube 62 anywhere along the axial extent of end 78, as the spiral passageway and tube are in fluid communication with one another. Of course, alternative outlets could be used in place of end 78, so long as they provided the air/oil stream with an appropriate means for exiting the spiral passageway and entering the perforated tube. For example, end 78 could be either partially or entirely closed along its axial length. If it is entirely closed, then openings more similar to inlet 70 would be required to put the spiral passageway and tube in fluid communication with one another.

Perforated tube 62 is a hollow cylindrical tube that generally extends along a central axis of spiral element 60. The perforated tube is in fluid communication with spiral passageway 72 and is designed to allow an air/oil stream to escape through an upper axial end 90, while allowing collected oil to drain through a lower axial end 92. Tube 62 preferably has a series of perforations 94 located along its axial length which can be in one of many forms, including a series of holes (as shown in the drawings), one or more elongated perforations such as a slit extending over a length of the tube, or other cutouts of various shapes and sizes, to name but a few. The perforated tube preferably has an axial length that exceeds the axial length X of spiral element 60 on both ends. Thus, the upper axial end 90 of tube 62 is proximate that of the spiral element, yet it extends beyond the upper axial end of the spiral element and provides an opening for the air/oil stream to escape. Similarly, the lower axial end 92, while being proximate to a lower axial end of the spiral element, also extends beyond that axial end such that scavenged oil can easily drain back into crankcase 26.

In the embodiment shown, lower axial end 92 of the perforated tube is tapered such that oil can drain out without gases from ventilation passage 40 easily entering in and thus bypassing spiral passageway 72.

According to another embodiment, the lower axial end of the perforated tube, either in tapered or non-tapered form, has a flexible sleeve open at both ends pulled over it. The sleeve, much like the opening to a balloon, allows oil to drain from perforated tube 62 back into the crankcase, but prevents air from easily entering perforated tube in the opposite direction. According to another embodiment, a check-valve or other type of valve mechanism could be installed at lower axial end 92 such that the air/oil stream cannot easily enter the perforated tube and thus bypass spiral passageway 72. It is also possible to construct the air/oil separating device 52 such that perforated tube 62 is removable for improved serviceability, or such that it is omitted altogether. In the case where it is omitted all together, a generally cylindrical space extending along a central axis of spiral element 60 takes the place of perforated tube 62. Oil collected in spiral passageway 72 drains out of a lower axial end outlet through the cylindrical space, just as a treated air stream exits through an upper axial end outlet through the cylindrical space.

Upper and lower covers 64 and 66 seal the upper and lower axial ends of spiral passageway 72, respectively, and can provide structural integrity to the spiral element. Each of the covers is a generally circular-shaped component with an opening located near its center which allows an axial end of perforated tube 62 to protrude through it. Thus, the covers seal spiral passageway 72 so that the circulating air/oil stream must pass through each of the loops of the spiral passageway before exiting though end 78. As those people skilled in the art will appreciate, upper and lower covers 64 and 66 could include additional components, such as rubber seals, etc. that improve the covers' sealing properties.

Thus far, spiral element 60 has been shown as having a generally cylindrical form. It is possible, however, to provide spiral element 60 and exterior and interior walls 74, 76 in a non-cylindrical shape, such as a conical or helical shape. In a conical embodiment, the loops of the spiral element will have a non-uniform radial width Y along their axial extent. Stated differently, a conical-shaped spiral element having its apex at a lower end will have loops with a greater radial width Y at their upper axial ends than they have at their lower axial ends. The conical and helical shaped elements are being provided simply as examples of types of alternative shaped spiral elements and external and internal walls, as other alternative shapes exist as well. Techniques for manufacturing such alternative shaped elements may differ from those of their cylindrical counterparts.

Oil-fill cap assembly 42 also includes an oil-fill cap 54 having an upper section 96 and a diametrically-reduced lower section 98. The exterior shape of oil-fill cap 54 is generally the same as conventional oil-fill caps; namely, cylindrical with engagement features on an outer surface of upper section 96 and installation features on an outer surface of lower section 98. The engagement features provide an operator with an easy-to-grip surface so that oil-fill cap assembly 42 can be either inserted into or removed from an opening in valve cover 50 via installation features such as threads. Of course, alternative installation features such as twist-lock, snap-in-place, etc. could be used for securing oil-fill cap assembly 42 within the valve cover opening. The interior of upper section 96 preferably includes an inner chamber 100 and an outer chamber 102, which are in fluid communication with one another via an opening 104. The inner chamber embodiment shown here generally surrounds air/oil separating device 52 so that at least part of that device is located within the oil-fill cap. The inner chamber is formed by an interior wall 106 which causes the treated air stream exiting air/oil separating device 52 to pass through inner chamber 100 and exit through one or more openings 104 before entering outer chamber 102.

Outer chamber 102 coaxially surrounds inner chamber 100 and is formed between interior wall 106 and an exterior wall 108. The outer chamber is in fluid communication with PCV valve 56, in addition to inner chamber 100. By requiring the treated air stream to pass through both the inner and outer chambers after it has exited the air/oil separating device, a further scavenging or oil removal process takes place which leaves the treated air stream entering PCV valve 56 with little or no oil at all. The inner and outer chambers are also in fluid communication with one another via an opening 110 located towards the bottom of those chambers. This opening allows oil collected in outer chamber 102 to flow into and intermix with oil collected from inner chamber 100 such that the accumulated oil may drain back into collection chamber 82 via opening 86. According to an alternative embodiment, a drainage tube could be used that extends from outer chamber 102, through inner chamber 100, and into air/oil separating device 52 such that oil collected from the oil fill-cap 54 can drain back into some other part of the air/oil separating device and out to crankcase 26. Of course, it is not necessary that oil-fill cap 54 have two chambers, as it is possible for it to alternatively have a single chamber or numerous chambers; provided it meets the spatial and other requirements of the application in which it is being used.

The lower section 98 of the oil-fill cap is diametrically-reduced so that it may be inserted within an opening in valve cover 50, and preferably includes some type of seal 120 such as an O-ring, an opening 122, and an open lower axial end 124. Opening 122 provides access for inlet 70 and the open lower axial end 124 forms an interference fit with air/oil separating device 52. It is preferable that the exterior portion of lower section 98 conforms to conventional oil-fill cap constructions as much as possible, so that oil-fill cap assembly 42 can be used with conventional openings without unnecessary modifications to the valve cover.

Oil-fill cap assembly 42 also includes PCV valve 56, which controls the flow of gases from the oil-fill cap assembly back to combustion chamber 30, and may be constructed according to one of many designs known in the art. Preferably, PCV valve 56 is a two-way check-ball valve, but it could easily be another type of PCV valve, including an orifice PCV valve. The state of valve 56 is affected by the downstream vacuum being controlled by a throttle valve (not shown). For instance, when the engine is being operated at wide open throttle (WOT), the throttle valve is open, which causes a vacuum formed during the suction stroke to primarily draw air from the intake manifold, and not from oil-fill cap assembly 42. When the engine is in idle, on the other hand, the throttle valve is at least partially closed. Thus, when the suction stroke creates a vacuum, more air is drawn from PCV valve 56 than during WOT. The operation of the PCV valve, the throttle valve, and other associated components are widely understood in the art, and thus a further explanation has been omitted. In the particular embodiment shown in FIG. 2, return passage 44 is made of a flexible hose material such that it acts as a sort-of tether for oil-fill cap 54. In this manner, when the oil-fill cap is removed it will not be accidentally lost, as it will still be connected to the flexible tether or return passage 44.

In manufacturing, the components of oil-fill cap assembly 42 are preferably made separately and are then subsequently assembled together. Manufacturing techniques in general, such as extrusion, injection molding, stamping, casting, welding, etc. are known in the art and are therefore not explained here in detail. As already mentioned, at least two techniques can be used to produce spiral element 60, including extruding the spiral element such that it assumes the desired cross-sectional shape, and rolling up a single sheet of flexible material so that the desired shape is achieved. If the later of these two techniques is used, then it is preferable that some type of force be applied to the spiral element so that it does not uncoil before assembly. The specific manufacturing techniques used to produce perforated tube 62 and the upper and lower covers 64 and 66 are dependent upon the type of materials they are made of. For instance, if the perforated tube is made of plastic, then extrusion or injection molding techniques could be used in their production. If upper and lower covers 64, 66 are made of metal, then they are likely produced according to a stamping process. Oil-fill cap 54 is preferably injection molded into a single integral component, however, inner and outer chambers 100, 102 could be injection molded separately and subsequently attached to one another. The PCV valve 56 is preferably constructed according to methods already known in the valve art. In assembly, tube 62 is inserted into spiral element 60 such that it generally extends along a central axis of the spiral element. Once the tube is in place, upper and lower covers are attached to the spiral element such that axial ends 90 and 92 of the tube may protrude through openings in covers 64 and 66, respectively. It is also possible to integrally form the upper or lower cover 64, 66 with perforated tube 62.

In operation, an air/oil stream B is drawn from crankcase 26, passes through ventilation passage 40, and enters air/oil separating device 52. The air/oil stream enters an outer loop of spiral passageway 72 through inlet 70, which is preferably oriented such that the incoming air/oil stream impinges exterior and/or interior walls 74, 76. This impact causes the entrained oil component of the air/oil stream to lose momentum and to be removed from the mixture. Once inside spiral passageway 72, the air/oil stream travels through the various loops of the spiral passageway, during which time it is constantly contacting exterior and interior walls 74, 76 which have a radius of curvature that is preferably decreasing. This impact causes a further removal or scavenging effect to occur, such that the removed oil collects along the walls and drips to the bottom of the spiral passageway. This process where the air/oil stream must pass through at least one full loop of the passageway is a different process than that which occurs in cyclonic air/oil separating devices. In those devices, for example, there may be a conical volume in which an air/oil stream circulates, but there is no spiral or other passageway defined by both internal and external walls having a decreasing, and thus tighter, radius of curvature. Furthermore, traditional cyclonic devices may provide a passageway with interior and exterior walls, but the passageway usually has a by-pass or some type of outlet so that the air/oil stream can exit the passageway without passing through at least one full loop.

By the time the air/oil stream has completed its path through spiral passageway 72, a certain amount of oil has accumulated at the bottom of the spiral passageway and drains out of an outlet in air/oil separating device 52 through the lower axial end 92 of perforated tube 62 (shown as droplets). In the case where the perforated tube has been removed, however, the collected oil drains out of a lower axial end of a cylindrical space. The drained oil is reintroduced into crankcase 26 where it is again used to lubricate the engine. The treated air stream, on the other hand, exits spiral passageway 72 anywhere along the axial length of outlet 78 and enters the perforated tube through one or more perforations 94. The treated air stream, now having less entrained oil, exits an outlet in the air/oil separating device through the upper axial end 90 of the perforated tube and enters oil-fill cap 54. Again, in the case where the perforated tube has been removed, the treated air stream exits air/oil separating device 52 through an axial end in the cylindrical space.

The treated air stream enters inner chamber 100 and contacts interior wall 106 such that an additional amount of oil is removed from the mixture. The removed oil collects at the bottom of inner chamber 100 and drains through opening 86 and into collection chamber 82. The treated air stream, now containing even less entrained oil if any at all, enters outer chamber 102 through an opening 104. A final oil removal process takes place in the outer chamber such that the collected oil gathers at the bottom thereof and drains back into inner chamber 100 through opening 110, and from there the oil drains back into collection chamber 82 in the same manner as the oil collected within the inner chamber. The treated air stream flows through PCV valve 56 such that it travels along return passage 44 and intermingles with fresh air entering the engine from the intake manifold. This intermingled air is then delivered to combustion chamber 30 and the process begins again.

It will thus be apparent that there has been provided in accordance with the present invention a oil-fill cap assembly comprising an air/oil separating device, an oil-fill cap, and a PCV valve, as well as a method of manufacture which achieve the aims and advantages specified herein. It will of course be understood that the foregoing description is of preferred exemplary embodiments of the invention and that the invention is not limited to the specific embodiments shown.

For instance, the air/oil separating device does not need to be integrated within the oil-fill cap assembly. It could be utilized as a separate, stand-alone component in a crankcase ventilation system (CVS). Furthermore, the specific arrangement of the oil-fill cap assembly could differ from that specifically shown above. For example, instead of the PCV valve being the last component in the oil-fill cap assembly through which the air flows, it could be the first component. In such an arrangement, the air/oil stream would first enter the PCV valve, then pass through either the air/oil separating or the oil-fill cap. According to yet another embodiment, the oil-fill cap assembly could only comprise the air/oil separating device and the oil-fill cap; the PCV valve could be located at a remote location and not within the oil-fill cap assembly. Likewise, it is possible to provide an assembly that only includes the air/oil separating device and the PCV, and not the oil fill-cap. Various changes and modifications will become apparent to those skilled in the art and all such variations and modifications are intended to come within the scope of the appended claims.

The invention claimed is:

1. An air/oil separating device for removing oil from an air/oil stream in an internal combustion engine, comprising:
   an inlet;
   a spiral element that extends alone a central axis and has a spiral passageway in fluid communication with said inlet, at least a portion of said spiral passageway is formed between external and internal walls of said spiral element that are made from a flexible sheet of material generally coiled about said central axis;
a first outlet in fluid communication with said spiral passageway and being generally located at a first axial end of said air/oil separating device;
a second outlet in fluid communication with said spiral passageway and being generally located at a second axial end of said air/oil separating device;
wherein the air/oil stream enters said inlet and travels through said spiral passageway such that at least some oil is removed from the air/oil stream and drains out of said second outlet, and a treated air stream exits out of said first outlet.

2. An air/oil separating device for removing oil from an air/oil stream in an internal combustion engine, comprising:
an inlet;
a spiral element that extends along a central axis and has a spiral passageway in fluid communication with said inlet;
a first outlet in fluid communication with said spiral passageway and being generally located at a first axial end of said air/oil separating device;
a second outlet in fluid communication with said spiral passageway and being generally located at a second axial end of said air/oil separating device, and;
a perforated tube generally extending along said central axis and being in fluid communication with said spiral passageway, wherein the air/oil stream enters said inlet and travels through said spiral passageway such that at least some oil is removed from the air/oil stream, said treated air stream exits out of said first outlet via a first axial end of said perforated tube, and said removed oil drains out of said second outlet via a second axial end of said perforated tube.

3. The air/oil separating device of claim 2, wherein said spiral passageway is in fluid communication with said perforated tube approximately along the entire axial length of said spiral passageway.

4. The air/oil separating device of claim 2, wherein said second axial end of said perforated tube is tapered.

5. An oil-fill cap assembly comprising an oil-fill cap and an air/oil separating device for removing oil from an air/oil stream in an internal combustion engine, said air/oil separating device is at least partially located within said oil-fill cap and includes:
an inlet;
a spiral element that extends along a central axis and has a spiral passageway in fluid communication with said inlet;
a first outlet in fluid communication with said spiral passageway and being generally located at a first axial end of said air/oil separating device;
a second outlet in fluid communication with said spiral passageway and being generally located at a second axial end of said air/oil separating device, and;
wherein the air/oil stream enters said inlet and travels through said spiral passageway such that at least some oil is removed from the air/oil stream and drains out of said second outlet, and a treated air stream exits out of said first outlet.

6. The oil-fill cap assembly of claim 5, wherein said oil-fill cap further comprises first and second chambers that are in fluid communication with said air/oil separating device such that oil captured in said chambers drains out of said oil-fill cap and into said air/oil separating device.

7. A crankcase ventilation system comprising an oil-fill cap assembly, a ventilation passage in fluid communication with a crankcase and said oil-fill cap assembly, and a return passage in fluid communication with said oil-fill cap assembly and a combustion chamber;
said oil-fill cap assembly includes an air/oil separating device, an oil-fill cap and a PCV valve;
said air/oil separating device removes oil from an air/oil stream in an internal combustion engine and includes:
an inlet;
a spiral element that extends along a central axis and has a spiral passageway in fluid communication with said inlet;
a first outlet in fluid communication with said spiral passageway and being generally located at a first axial end of said air/oil separating device, and;
a second outlet in fluid communication with said spiral passageway and being generally located at a second axial end of said air/oil separating device;
wherein the air/oil stream enters said inlet and travels through said spiral passageway such that at least some oil is removed from the air/oil stream and drains out of said second outlet, and a treated air stream exits out of said first outlet.

8. An air/oil separating device for removing oil from an air/oil stream in an internal combustion engine, comprising:
an inlet;
a passageway in fluid communication with said inlet, said passageway having exterior and interior walls that form at least one full loop, and;
a tube in fluid communication with said passageway, said tube having first and second axial ends;
wherein the air/oil stream enters said inlet and travels through said passageway such that it contacts said exterior and interior walls, said contact between the air/oil stream and said walls causes at least some oil from the air/oil stream to collect within said passageway, said collected oil drains out of said tube second axial end and a treated air stream exits said tube first axial end.

9. The air/oil separating device of claim 8, wherein said external and internal walls are made from a flexible sheet of material generally coiled about said tube.

10. The air/oil separating device of claim 8, wherein said external and internal walls are made from an extruded plastic material.

11. The air/oil separating device of claim 8, wherein said passageway is generally spiral shaped and has an axial length X and said full loop(s) has a radial width Y, such that X is greater than Y.

12. The air/oil separating device of claim 8, wherein said passageway is generally spiral shaped and has an axial length X and said full loop(s) has a radial width Y, such that X is between 20 mm–80 mm and Y is between 2 mm–8 mm.

13. The air/oil separating device of claim 8, wherein said passageway is generally spiral shaped and includes between 1–10 full loops.

14. The air/oil separating device of claim 8, wherein said inlet is located towards a second axial end of said air/oil separating device, sad second axial end of said air/oil separating device is proximate said second axial end of said tube.

15. The air/oil separating device of claim 8, wherein said tube is perforated and generally extends along a central axis of said passageway.

16. The air/oil separating device of claim 15, wherein said passageway is in fluid communication with said perforated tube approximately along the entire axial length of said passageway.

17. The air/oil separating device of claim 8, wherein said second axial end of said tube is tapered.

18. The air/oil separating device of claim 8, further comprising first and second generally circular covers that seal first and second axial ends of said passageway, respectively.

19. An oil-fill cap assembly comprising an oil-fill cap and the air/oil separating device of claim 8, wherein said air/oil separating device is at least partially located within said oil-fill cap.

20. The oil-fill cap assembly of claim 19, wherein said oil-fill cap comprises first and second chambers that are in fluid communication with said air/oil separating device such that oil captured in said chambers drains out of said oil-fill cap and into said air/oil separating device.

21. An assembly comprising a positive crankcase ventilation (PCV) valve and the air/oil separating device of claim 8, wherein said treated air stream exits through said PCV valve.

22. A crankcase ventilation system comprising a ventilation passage, a return passage, and an oil-fill cap assembly including the air/oil separating device of claim 8, an oil-fill cap and a PCV valve, wherein said ventilation passage is in fluid communication with a crankcase and said oil-fill cap assembly, and said return passage is in fluid communication with said oil-fill cap assembly and a combustion chamber.

23. A method of manufacturing an air/oil separating device, said method comprising the steps of:
   (a) providing a spiral element having a spiral passageway, a central axis, and first and second axial ends;
   (b) providing a tube having first and second axial ends;
   (c) providing first and second covers each having a generally circular opening;
   (d) inserting said tube into said spiral element such that it generally extends along said central axis;
   (e) attaching said first cover to said spiral element first axial end such that said tube first axial end protrudes through said opening in said first cover, and;
   (f) attaching said second cover to said spiral element second axial end such that said tube second axial end protrudes through said opening in said second cover.

24. An air/oil separating device for removing oil from an air/oil stream in an internal combustion engine, comprising:
   an inlet extending in a generally radial direction;
   a spiral element extending along a central axis that is generally perpendicular to said radial direction, said spiral element having a spiral passageway in fluid communication with said inlet and having exterior and interior walls;
   a perforated tube extending along said central axis and being in fluid communication with said spiral passageway, said perforated tube having a first axial end and a tapered second axial end, and;
   wherein the air/oil stream flows through said air/oil separating device such that: i) it enters said inlet in a generally radial direction, ii) it impinges said exterior and/or interior walls of said spiral passageway, iii) it travels through said spiral passageway, iv) it impinges and enters said perforated tube, v) at least some oil is removed from the air/oil stream and drains, out of said tapered second axial end of said perforated tube, and vi) a treated air stream exits out of said first axial end of said perforated tube.

* * * * *